Feb. 16, 1943.     R. B. LAIRD     2,311,551
IMPLEMENT COMBINATION
Filed Feb. 25, 1941     6 Sheets-Sheet 5
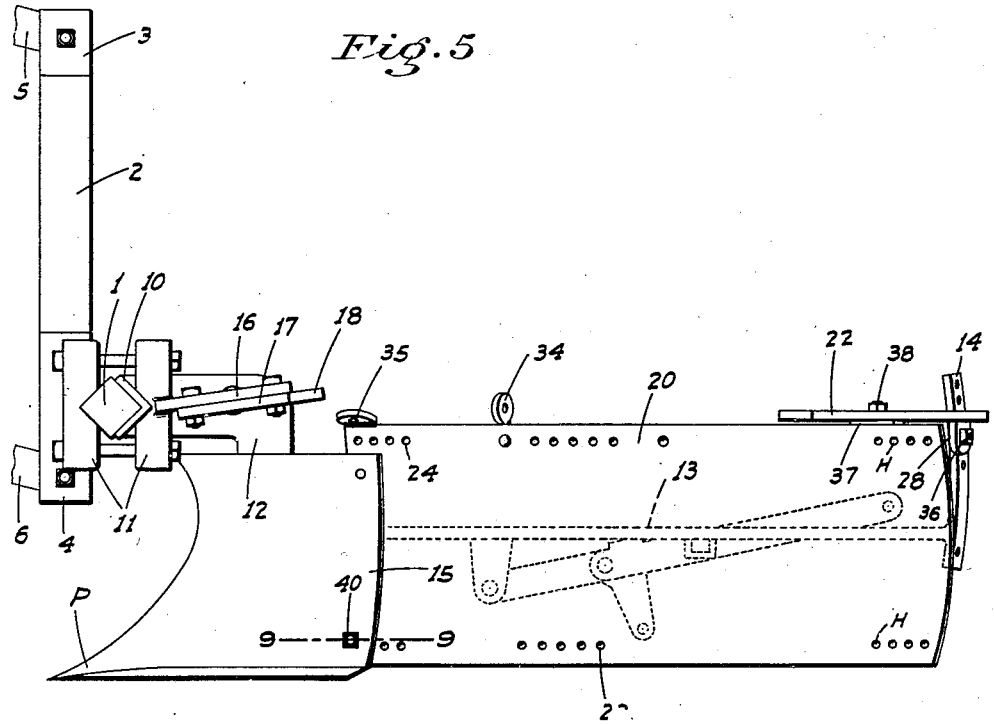
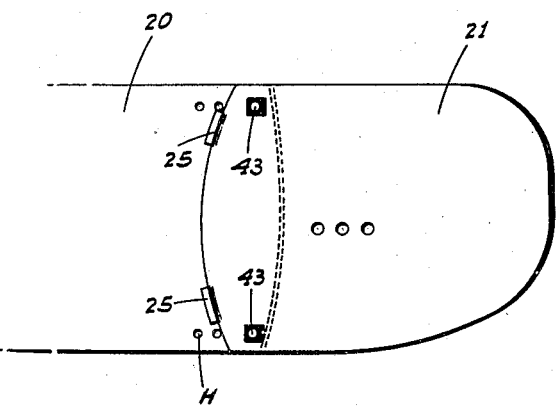
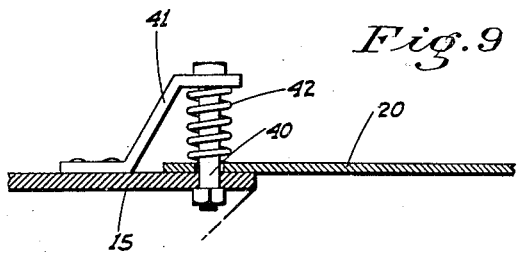
INVENTOR.
Royal B. Laird
BY
ATTORNEYS Feb. 16, 1943.  R. B. LAIRD  2,311,551
IMPLEMENT COMBINATION
Filed Feb. 25, 1941  6 Sheets-Sheet 6

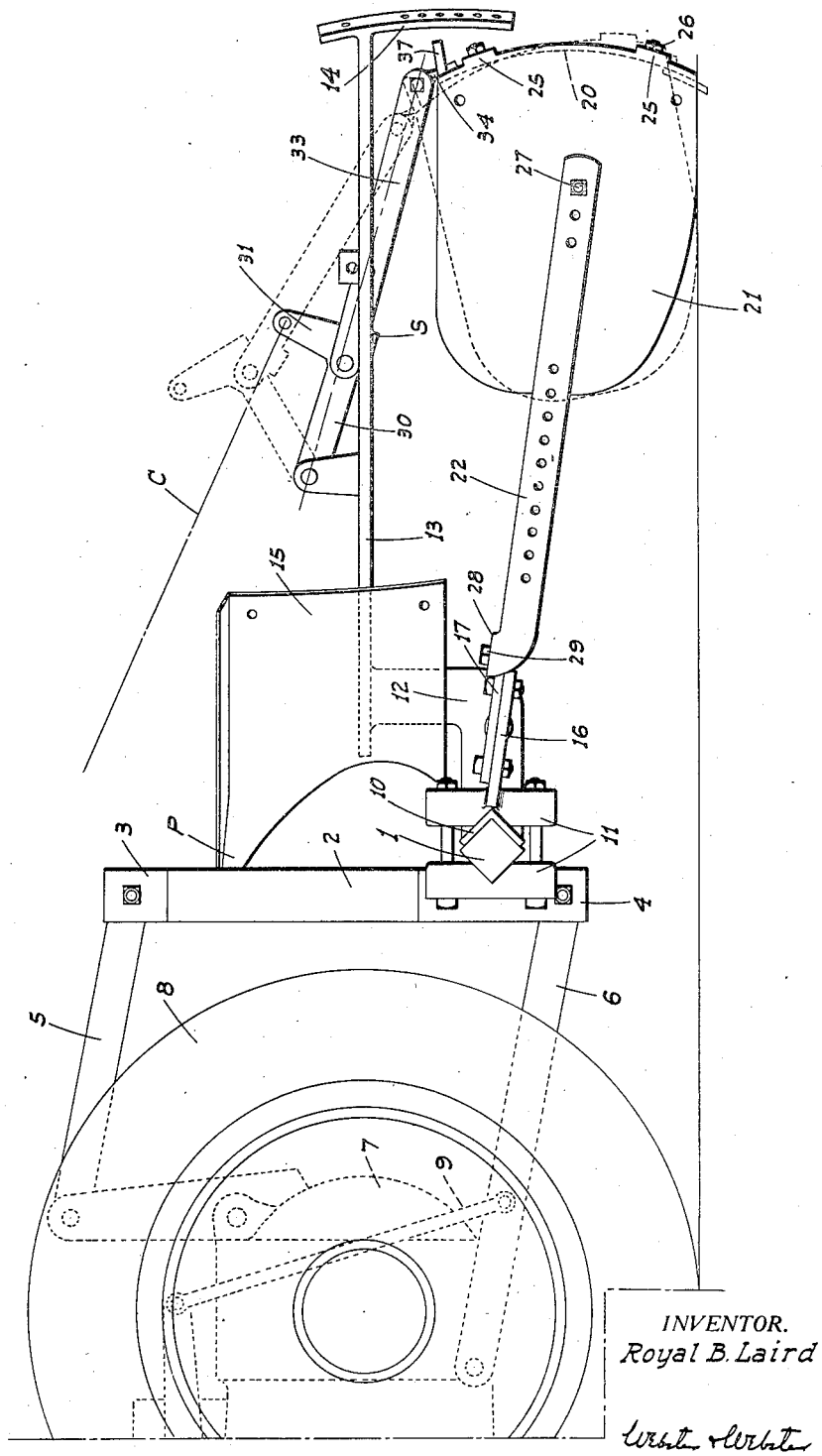

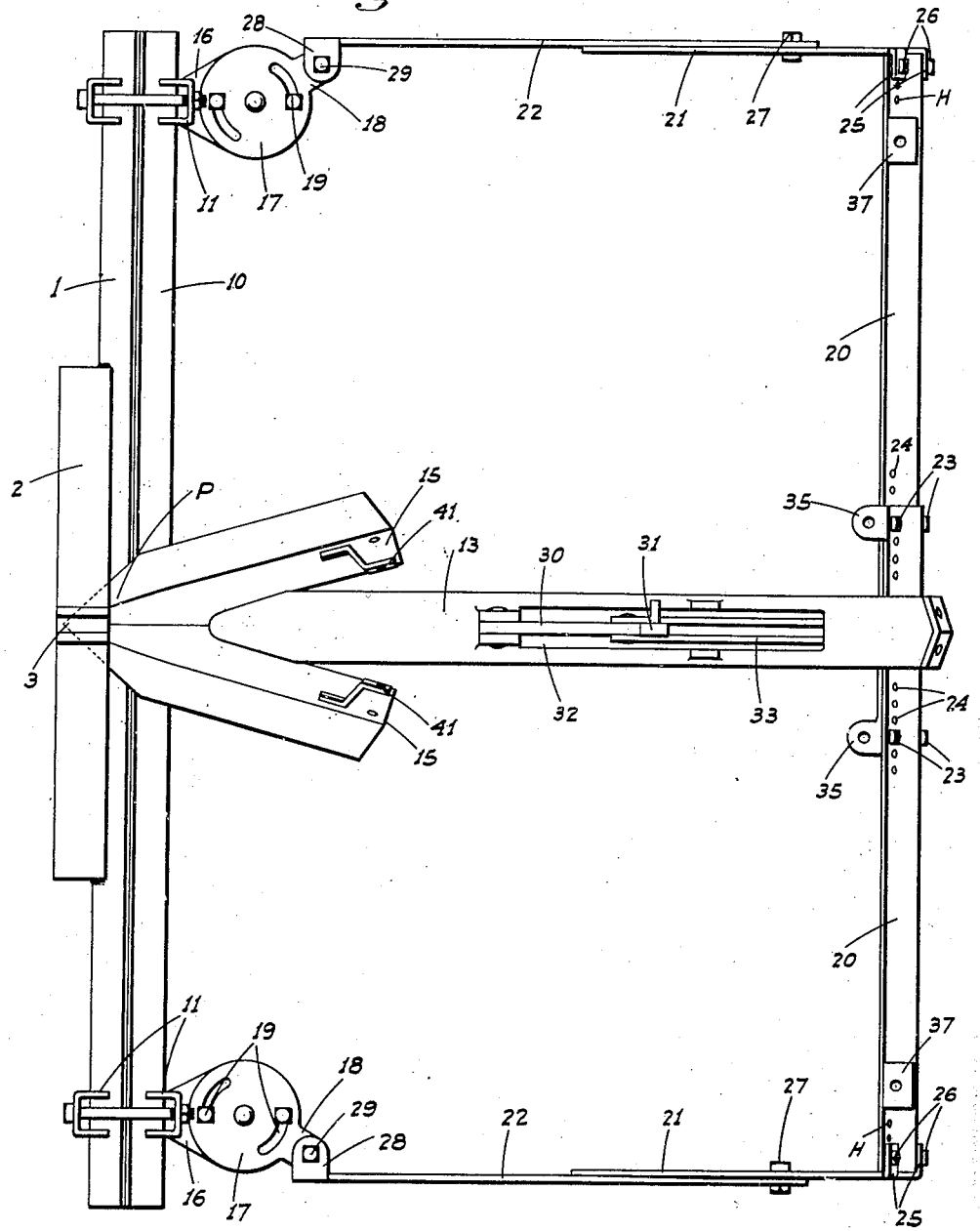

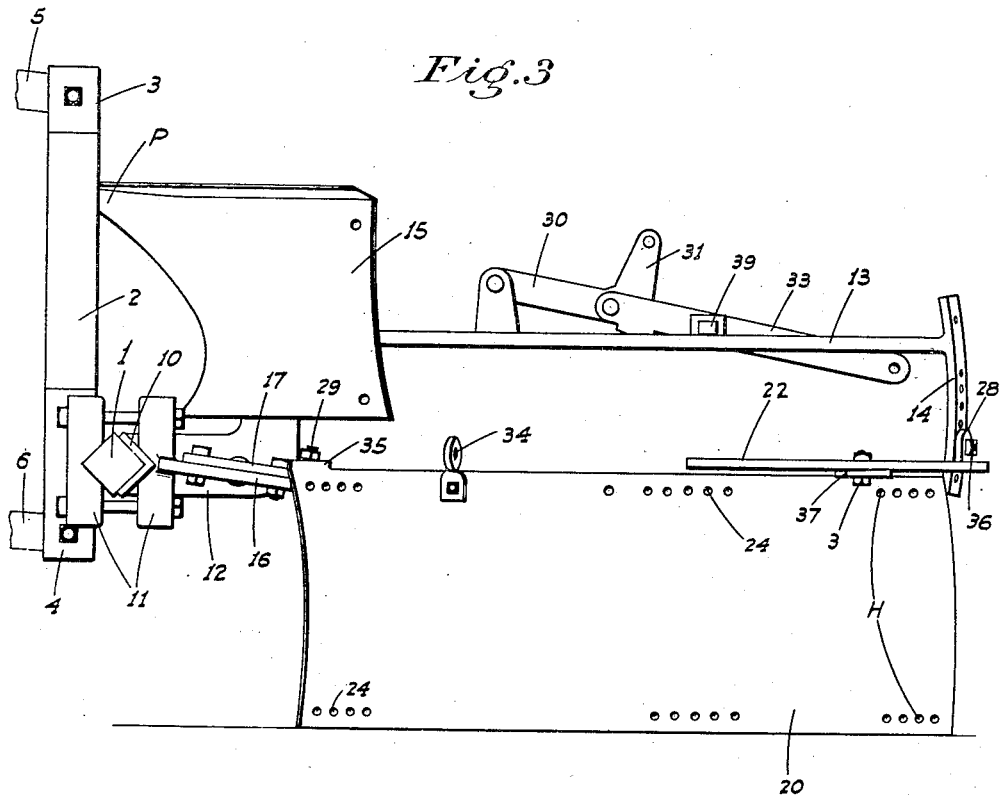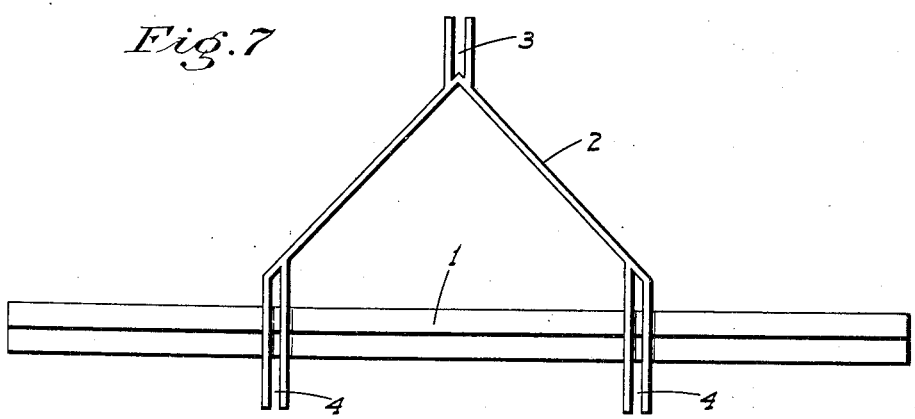

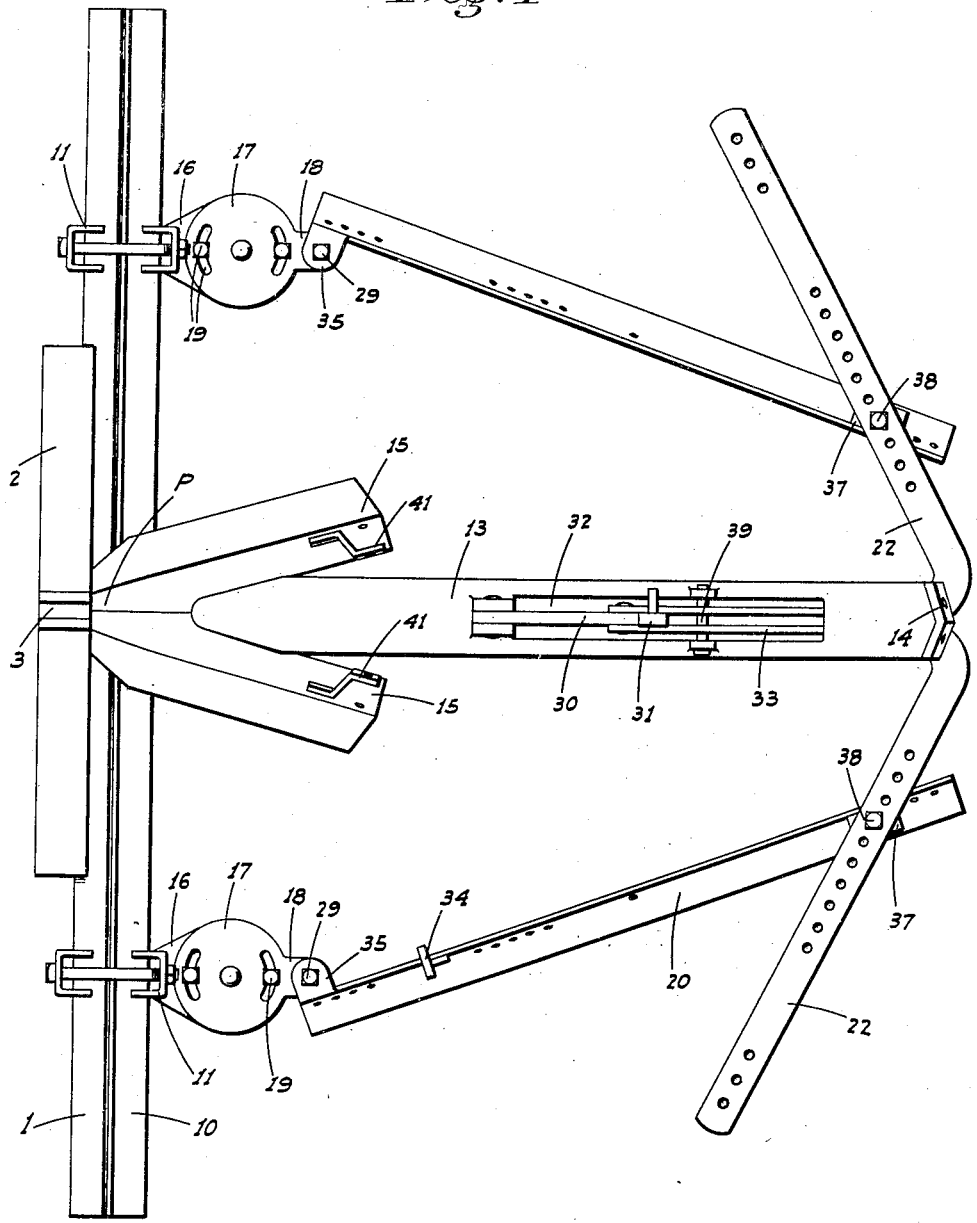

INVENTOR.
Royal B. Laird
BY
ATTORNEYS

Patented Feb. 16, 1943

2,311,551

UNITED STATES PATENT OFFICE 2,311,551

IMPLEMENT COMBINATION

Royal B. Laird, Merced, Calif.

Application February 25, 1941, Serial No. 380,411

10 Claims. (Cl. 37—98)

This invention relates to agricultural ground working implements, my principal object being to provide a combination implement which, by rearrangement of certain of its various parts, can be used as a scraper, a ditcher or a ridger.

The implement is particularly designed and admirably adapted for the use of the relatively small farmer operating in the parts of this country where irrigation is employed in connection with the growing of crops, since it enables him to carry out the various ground preparing operations necessary with irrigation, without putting him to the heavy expense necessary in connection with the purchase of separate implements for these different operations, as must now be done.

A further object of the invention is to provide an implement which when arranged as a scraper has what I believe to be a novel means for controlling the dumping of the same. Also, the parts of the scraper are so arranged that whether used as a scraper, a ditcher or a ridger, it may be readily adjusted for different scraping, ditching or ridging widths, as operating conditions may require.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved implement as arranged as a scraper and as connected to a draft tractor of a certain well-known make.

Figure 2 is a top plan view of the implement arranged as a scraper.

Figure 3 is a side elevation of the implement as arranged as a ridger.

Figure 4 is a plan view of the same.

Figure 5 is a side elevation of the implement arranged as a ditcher.

Figure 7 is a front view of the draft member of the implement detached.

Figure 8 is a fragmentary side view showing the use of the side plates or wings of the scraper as extensions of the ditcher or ridger plates.

Figure 9 is an enlarged fragmentary section on line 9—9 of Fig. 5.

Figure 6:
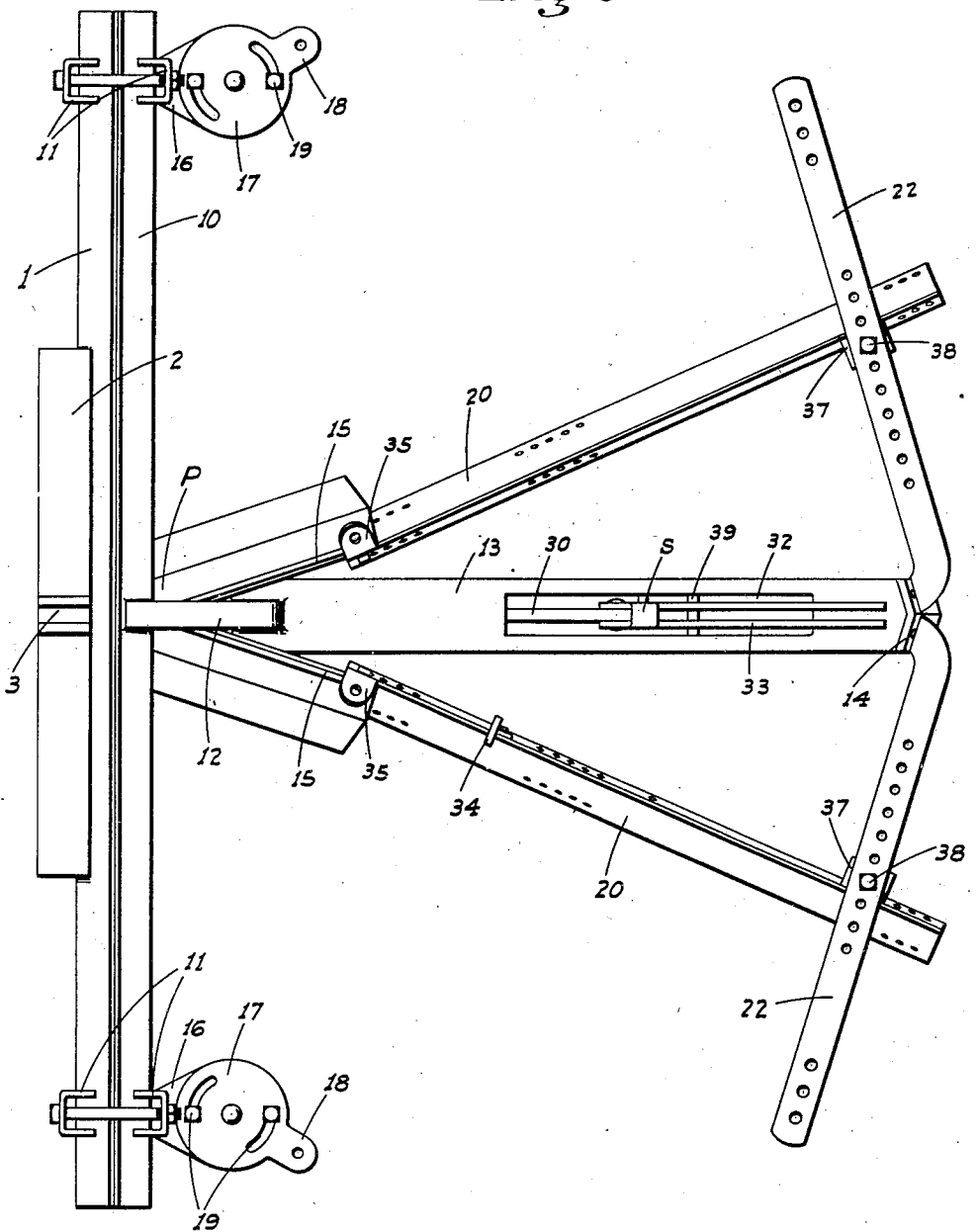
Figure 6 is a plan view of the same.

Referring now more particularly to the characters of reference on the drawings, the implement comprises a rigid transverse beam 1 preferably of rectangular cross-section, having a wishbone draft connection member 2 rigid therewith and upstanding therefrom centrally thereof. This member is provided at the top with a central clevis 3 and at the bottom with transversely spaced clevises 4 for pivotal connection with top and bottom draft arms 5 and 6 respectively. These arms are pivoted on and project rearwardly from the frame or mechanism housing 7 of a wheeled tractor 8 of a certain make, the arms 6 being connected to controlled raising and lowering links 9. With this arrangement, it will be seen that the member 2, and hence the beam 1, are maintained against tilting, while being held at any desired level relative to the ground.

Invertedly and slidably engaging the beam 1 on the back side thereof is a rigid channel beam 10, releasably held against movement on the beam 1 by bolt connected clamping brackets 11 of suitable form and adjustable along the beam 10. A rigid standard 12 of L-shaped form projects rearwardly from the beam 10 centrally of its ends and terminates in a vertical portion. A rigid, longitudinal beam 13 is secured on and projects rearwardly from the outer end of said vertical portion of the standard and terminates in a vertically extending plate 14 having longitudinal rows of bolt holes therein as shown.

The forward end of the beam 13 and the adjacent vertical portion of the standard 12 project between and rigidly support a forwardly facing V-point or plow member P of symmetrical form and which includes a pair of rearwardly diverging plates 15. This point, when the vertical portion of the standard 12 projects upwardly, is disposed in inverted relation to the ground, as shown for instance in Fig. 1.

Substantially horizontal and relatively small disc-like plates 16 are rigid with and project rearwardly from the rear members of the clamping brackets 11, and are centrally pivoted in connection with similar plates 17 disposed in face to face contact therewith. Each plate 17 is formed with a rearwardly projecting radial ear 18 disposed in a horizontal plane, and said plates 16 and 17 are held in any adjusted position relative to each other by a slot and bolt arrangement 19, so that the transverse spacing between the ears 18 may be altered to suit.

The above parts comprise the fixed frame structure of the combination implement, the beam 10 being set in the beam 1 so that the plow point is inverted when the implement is arranged as a scraper or a ridger, and being turned relative to the beam 1 so that the plow point is in a lowered ground engaging position when the implement is arranged as a ditcher, as clearly shown.

This inversion of beam 10 relative to beam 1 is necessary, since the draft member 2 must always project upwardly from the beam 1 regardless of the use to which the implement is being put.

The separable parts of the implement, usable in different positions to form the different implements, are in the main a pair of relatively long, rectangular, transversely curved plates 20 bladed along one edge, a pair of flat wing plates 21, and a pair of tension or compression bars 22.

When the implement is arranged in the form of a scraper as shown in Figs. 1 and 2, the plates 20 are disposed in overlapping relation with each other and according to the total length desired, and said overlapping portions are adjustably secured together by bolts 23 passed through alined ones of the rows of bolt holes 24 provided in said plates near the top and bottom. The wing plates are curved along the rear edge to correspond to the curvature of the blade plates, and such edge of each wing plate is provided with ears 25 bent to overlap a plate 20 at its outer end and to be secured thereto by bolts 26. It will thus be seen that the plates 20 with the wings thereon form a scraper bowl of conventional form.

The bars 22 are pivotally connected to the wings intermediate their ends by removable bolts 27, said bars at their forward end being formed with ears 28 bent at right angles or horizontally and then engaging the ears 18, to which they are detachably secured by bolts 29. The total width of the scraper bowl is determined, of course, by the amount of overlap of the plates 20, the bars 22 being then maintained parallel to each other either by adjusting the plates 17 on the plates 17, or by adjusting the clamping brackets themselves along the beam 10. The scraper bowl thus provided is obviously of a type suitable for leveling, check forming, and other operations necessary when preparing for irrigation.

Such a bowl is dumped, with forward movement of the implement, by the rotation of the bowl about the pivot bolt 27, the wings 21 then rolling on the ground and lifting the lower bladed edge of the plate unit 20 from the ground, as will be obvious. In order to control this dumping action, I provide the following releasable holding means: Pivoted on top of the beam 13 intermediate its ends is a rearwardly projecting link 30 having an upstanding arm 31 at its rear end. Pivoted on said link 30 adjacent its rear end, and projecting rearwardly and downwardly through a longitudinal slot 32 in said beam 13 is another link unit 33. This is detachably pivoted at its rear end on an ear 34 adjustably secured on and upstanding from one of the plates 20. The linkage is arranged so that when the bowl is in a scraping position, said linkage is broken down slightly below a dead center position, such break down being limited by the engagement of the forward link 30 at its rear end with a stop shoulder S on the rear link. With the forward movement of the implement, therefore, the resulting rotative pressure of the ground against the lower edge of the plate unit 20 is restrained from being effective to rotate the bowl. When, however, the arm 31 is pulled up to lift the linkage above said dead center position, the rotative pressure on the bowl is no longer restrained, and as a result the bowl rotates freely to a dumping position as indicated by dotted lines in Fig. 1. The bowl then returns to a normal position of its own weight as soon as the load is discharged therefrom. The arm 31 is thus pulled from the tractor by any suitable means, such as a pull cord removably applied to the arm and indicated at C.

In order to arrange the implement for ridging purposes, the link 33 is disconnected from the ear 34, the plates 20 are uncoupled from each other, the wing plates are removed, and the bars 22 are disconnected from the wings and from the ears 18. The plates 20 are then placed in rearwardly converging relation with each other as shown in Fig. 4 and so that the concave side thereof faces inwardly, and are removably connected with the ears 18 by overhanging ears 35 formed on the plates 20 at the top and at one end, the bolts 29 being again used as the connecting means. The plates are maintained in the desired converging relation to each other by the bars 22 which now extend laterally from the upstanding plate 14, which as previously stated is at the rear end of beam 13.

The bars are laid flat and are turned so that their ears 28 engage the plate 14, to which they are removably secured at the desired level by bolts 36, as shown in Fig. 3. The bars overhang the top of plates 20 intermediate their ends, and rest on horizontal ears 37 which project from the top edge of the plates 20 near their end opposite ears 35, being detachably secured to ears 37 by bolts 38.

The bars 22 are provided with rows of holes for the bolts 38 as shown, so that the angle of convergence of the plates 20 may be altered. The plate 14 is also provided with vertical rows of holes for the bolts 26 so that the angle of the plates 20 relative to a horizontal plane may also be altered, it being understood that the bolts 38 and 29 are left somewhat loose, while making any adjustment, so that the plate ears may be somewhat angularly disposed relative to the ears 18 and the bar 22. With this arrangement, the point P remains in its inverted position out of the way, and the linkage 32 may be held from dropping by means of a transverse pin 39 mounted on the beam 13 and projecting through a hole in link 32. The pull cord of the arm 31 is also removed.

When it is desired to arrange the implement as a ditcher, the plates 20 and bars 22 are again dismounted and the beam 10 is reversed or inverted in position relative to the beam 1 so as to dispose the point P in a ground engaging position, as shown in Fig. 5. The plates 20 are then placed in rearwardly diverging relation to each other from between the plates 15 at their rear end, and so that the concave side of the plates face outwardly, as shown. The plates 20, which are approximately the same height as the point P, are disposed so that the ears 35 are at their forward end, so that they overhang the plates 15 without interference. The plates 20 are detachably connected near the bottom to the plates 15 adjacent their rear end by bolts 40 projecting through said plates and brackets 41 mounted on the plates 15 laterally inward thereof.

Said plates 20 and 15 are then held in yieldable engagement with each other by compression springs 42 about the bolts 40 and extending between the inner face of plates 20 and said brackets 41, as shown in Fig. 9. The plates 20 may thus be set at different diverging angles without loosening the bolts 40 or without tending to warp the plates 15. The bars 22 are again used to maintain the plates 20 in adjustably diverging relation, and at different angles relative to the ground in the same manner as when the structure is arranged as a ridger and as previously described.

When the implement is arranged either as a ridger or as a ditcher, the wing plates 21 may, if desired, be employed as extensions of the plates 20 as shown in Fig. 8, being removably secured thereon on their concave side by bolts 43. The wings may thus be secured either in direct longitudinal alinement with the plates 20 or at a horizontal angle relative thereto, using certain ones of the same bolt holes H originally used in connecting the wings to the plates 20. The wings when so used serve to aid in packing the sides of the ridge or the banks of a ditch, as the case may be.

It is of course to be understood that the plates, wings and bars are all initially provided with a sufficient arrangement of bolt holes to meet all requirements of adjustment and connection, so that the user can readily set up the implement in its various forms and to any desired adjusted position without the use of any tools other than an ordinary wrench.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A scraper including a supporting structure adapted for connection with a draft device, a scraper bowl, means mounting the bowl on the structure for rotation and including side bars mounted at their forward end on the structure and extending rearwardly and pivoted at their rear end on the bowl, and releasable holding means between the bowl and structure normally preventing forward rotation of the bowl about the bar pivots; said holding means comprising a pair of links pivoted together at adjacent ends and extending lengthwise of the scraper, means pivoting the forward link at its forward end on the structure, means pivoting the rear link at its rear end on the bowl at the top thereof, said links being broken down below a dead center position when the bowl is in scraping position, means limiting such breaking down movement and means applied to one link to raise the same above dead center position.

2. A scraper comprising a supporting structure which includes a transverse beam adapted for connection with a draft device, a scraper bowl including a pair of back plates overlapping each other, means adjustably connecting said plates together whereby to alter the overall width of the bowl, side tension bars projecting forwardly from the bowl adjacent its side edges, and members adjustably mounted on the beam on which the arms are secured at their forward end.

3. A scraper comprising a supporting structure which includes a transverse beam adapted for connection with a draft device, a scraper bowl including a pair of back plates overlapping each other, means adjustably connecting said plates together whereby to alter the overall width of the bowl, side tension bars projecting forwardly from the bowl, members mounted and projecting rearwardly from the beam, elements adjustably turnable on said members, ears on said elements projecting radially thereof, and ears on the bars at their forward end engaging and secured to the first named ears.

4. A convertible ground working implement comprising a rigid structure adapted for connection to a draft device, said structure including a longitudinal rearwardly extending beam, two initially separate ground working blades disposed on edge on opposite sides of the longitudinal beam, said blades being arranged for connection with said structure, selectively in rearwardly diverging relation to said beam as a ditcher, in rearwardly converging relation to said beam as a ridger, or, with adjacent ends connected, in transverse relation to said beam as a scraper, and instrumentalities consisting essentially of a single set of connector elements adapted to be used in common to rigidly but removably connect said blades with said structure in any one of said positions relative to the beam.

5. A convertible ground working implement comprising a rigid supporting structure adapted for connection with a draft device, said supporting structure including a transverse beam and a longitudinal rearwardly extending beam rigidly connected together in substantially T-shaped relation in plan, two initially separate ground working blades disposed on edge on opposite sides of the longitudinal beam, said blades being arranged for connection, selectively, with said longitudinal beam in rearwardly diverging relation as a ditcher, at their forward end with said transverse beam in rearwardly converging relation as a ridger, or, with adjacent ends connected, with said longitudinal beam in transversely extending relation as a scraper, and instrumentalities consisting essentially of a single set of connector elements adapted to be used in common to rigidly but removably connect said blades with said beams in any one of said selective positions.

6. A convertible ground working implement comprising a rigid supporting structure adapted for connection with a draft device, said supporting structure including a transverse beam and a longitudinal rearwardly extending beam rigidly connected together in substantially T-shaped relation in plan, two initially separate ground working blades disposed on edge on opposite sides of the longitudinal beam, said blades being arranged for connection, selectively, with said longitudinal beam in rearwardly diverging relation as a ditcher, at their forward end with said transverse beam in rearwardly converging relation as a ridger, or, with adjacent ends connected, with said longitudinal beam in transversely extending relation as a scraper, and instrumentalities to connect said blades with said beams in any one of said selective positions, said instrumentalities including a pair of initially separate bars corresponding to said pair of blades, said bars being arranged for connection, selectively, between the longitudinal beam and the rear end portions of the corresponding blades when the latter are in said divergent or convergent positions, or between the transverse bar and the outer end of corresponding blades when the latter are in said transverse position.

7. A convertible implement as in claim 5, in which said instrumentalities include a pair of initially separate plates disposed on edge and corresponding to said ground working blades; said plates being arranged for connection, selectively to the rear end of said ground working blades as extensions thereof when the latter are in said divergent or convergent positions, or to the outer end of corresponding blades as forwardly projecting wings when said blades are in said transverse position.

8. A convertible implement as in claim 5 in which said supporting structure is invertibly mounted, there being a forwardly facing V-shaped plow member mounted on said longitudinal beam adjacent its forward end; said plow member depending from said longitudinal beam when the structure is in one position, and the blades when in said divergent position being connected at their forward end with corresponding sides of the plow member, the structure being positioned so that said plow member projects above the longitudinal beam when said blades are in said convergent and transverse positions.

9. A ditcher comprising a supporting structure adapted for connection to a draft device and which includes a longitudinal beam held against deflection in a vertical plane, a V-point member rigid with the beam adjacent its forward end and projecting below the same, said member including upstanding diverging side plates, a pair of relatively long ditcher plates projecting rearwardly from the member in diverging relation to each other and at their forward end being overlapped by the side plates of the member, and means connecting the overlapping portions of the plates for yieldable angling movement of the ditcher plates in a horizontal plane, there being means between the beam and said ditcher plates to maintain the latter in different selected angular positions relative to each other.

10. A ditcher as in claim 9, in which the plate connecting means, for adjacent plates, comprises a bracket fixed on the member plate ahead of the ditcher plate and overhanging the latter in spaced relation thereto, a bolt through the bracket and said plates and a compression spring on the bolt between and engaging the bracket and the adjacent face of the ditcher plate.

ROYAL B. LAIRD.